UNITED STATES PATENT OFFICE.

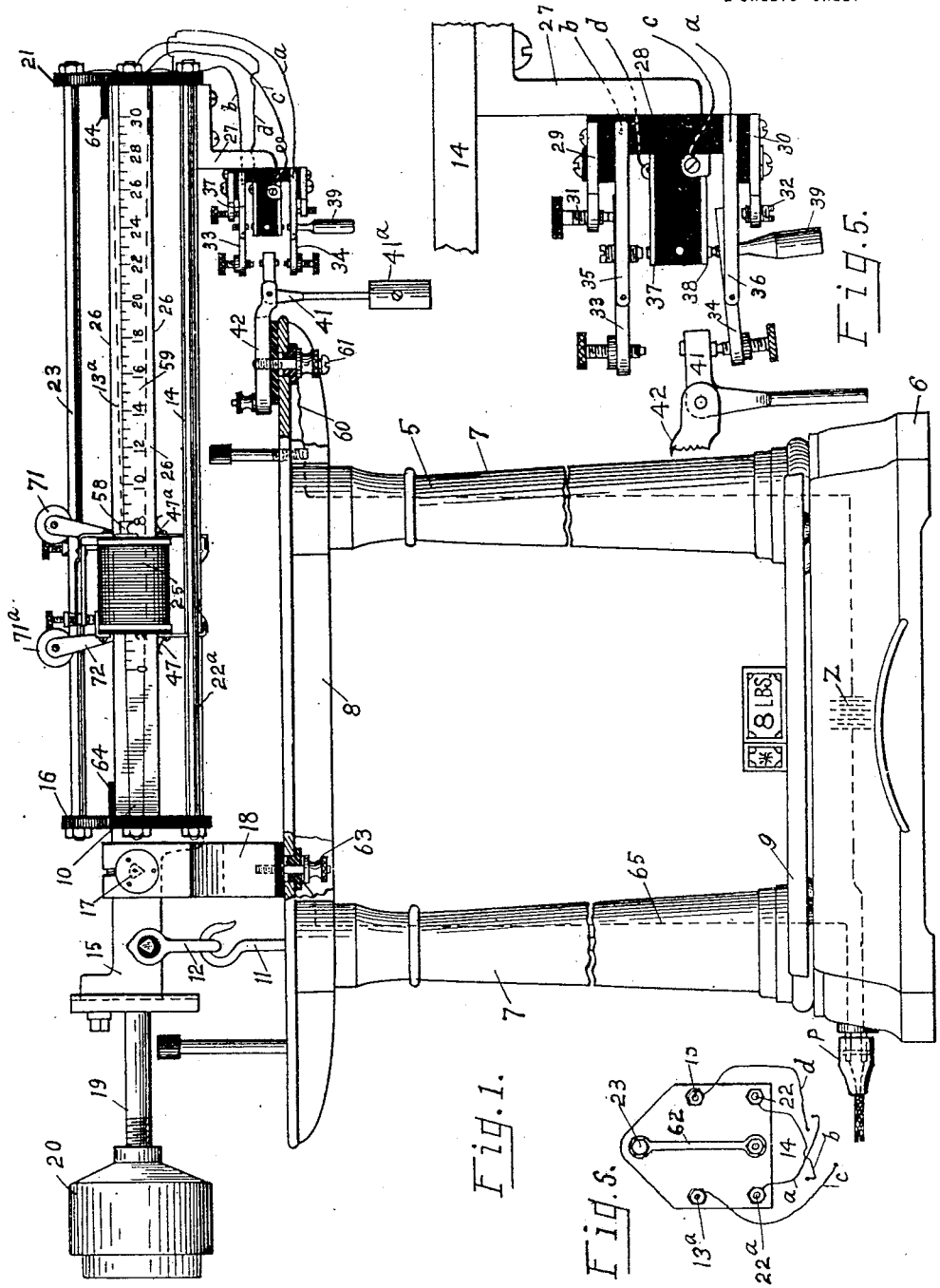

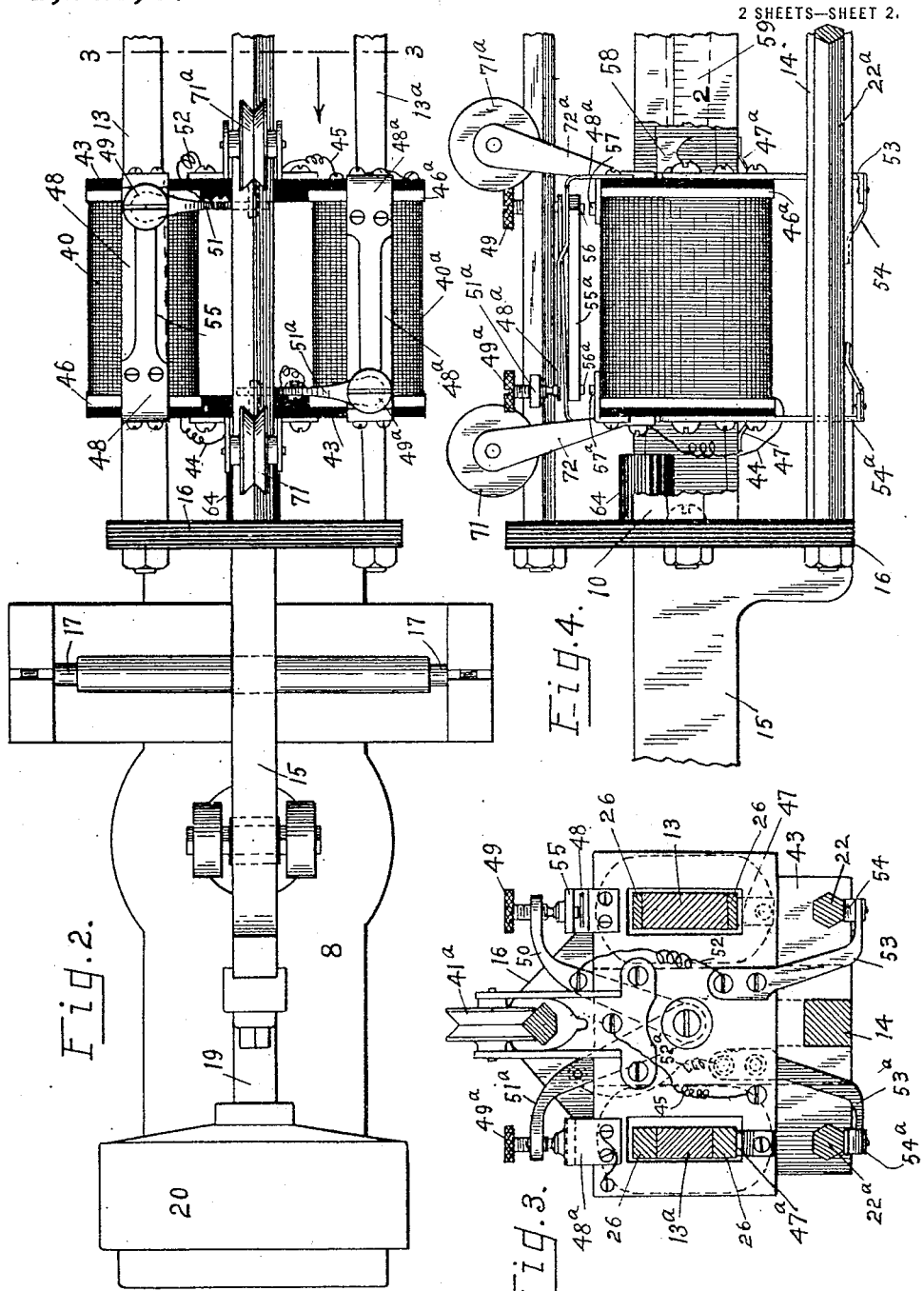

SAMUEL G. CRANE, OF TOLEDO, OHIO, ASSIGNOR TO TOLEDO SCALE COMPANY, OF TOLEDO, OHIO, A CORPORATION OF OHIO.

ELECTRIC AUTOMATIC SCALE.

1,248,273.  Specification of Letters Patent.  Patented Nov. 27, 1917.

Application filed March 4, 1915. Serial No. 11,968.

*To all whom it may concern:*

Be it known that I, SAMUEL G. CRANE, residing at Toledo, in the county of Lucas and State of Ohio, have invented new and useful Improvements in Electric Automatic Scales, of which the following is a specification.

This invention relates to automatic scales and more particularly to that class of beam scales in which a poise for counter-balancing or offsetting the load upon the scale platform is automatically moved along the beam until equilibrium is established.

The primary object of this invention is to provide an automatic scale with electrically-actuated poise mechanism whereby the weight of an article or articles placed upon the scale platform is offset and indicated by the automatic movement of the poise along the scale beam.

A further object of this invention is to provide electrically-actuated automatic means to move the poise along the scale beam until the beam balances, the current to energize the automatic means being under the control of the movement of the beam.

A further object of the invention is to provide a scale employing a poise in the form of solenoid coils automatically movable upon the scale beam and governed in its movements by electric connections and mechanisms under the control of the movement of the beam.

A further object of the invention is to provide electric connections and mechanisms whereby the speed of the poise in its travel along the scale beam may be automatically governed and controlled, automatic means being provided whereby the poise is caused to travel at a comparatively high rate of speed until it approaches the counter-balancing point on the scale beam and then is caused to move at a greatly reduced rate of speed until the counter-balancing point is attained, the poise being automatically stopped at the counter-balancing point.

With the above and other objects in view which will more readily appear as the invention is better understood, this invention consists in the novel construction, combination and arrangement of parts to be hereinafter more fully described and particularly pointed out in the subjoined claims.

Reference is to be had to the accompanying drawings, illustrating a preferred embodiment of my invention by way of exemplification and wherein similar reference characters designate similar parts throughout the several views.

In the drawings:

Figure 1 is a front elevation with portions broken away of a scale embodying my invention, the scale being shown with a load upon the scale platform and the beam in a balanced position.

Fig. 2 is a plan view of a portion of the scale beam shown in Fig. 1.

Fig. 3 is a detail transverse section taken substantially on the line 3—3 of Fig. 2.

Fig. 4 is a detail elevation of a portion of the scale beam and the poise, one of the side beams being broken away.

Fig. 5 is an enlarged detail elevation of the automatic switch and selector mechanisms utilized in the scale shown in Fig. 1, and Fig. 6 is a detail elevation of the forward end of a scale beam without the switch and selector mechanisms secured thereto.

In the drawings, 5 designates the framework of the scale, which, as herein shown, comprises a base 6 having a pair of columns 7 adjacent the rear extremity thereof and connected at their upper extremities by a crossbar 8. The base 6 is adapted to inclose the platform levers (not shown) supporting the platform 9 of the scale, and connections are made for rocking the scale beam 10 from the platform levers whenever a load is placed upon the platform 9 through the hook-rod 11 and U-shaped yoke 12 substantially as shown in Fig. 1.

The scale beam 10 comprises, as herein shown, a pair of parallel side beams 13 and 13ª and a lower rod or arm 14 arranged substantially centrally of the side beams 13 and 13ª, this lower arm being bent upwardly adjacent the insulating end plate 16 connecting the inner ends of the side beams 13 and 13ª and then rearwardly to form an extension 15 carrying the knife-edge bearings 17 of the scale beam, which rest in suitable bearings carried by the bracket 18 secured upon, but insulated from, the crossbar 8 of the framework of the scale. Suitably secured to and extending rearwardly substantially in alinement with the extension 15 of the lower arm 14 is a threaded adjusting member 19 adapted to receive the sealing weight 20 for adjustment relatively to the fulcrum of the beam in the usual manner. The inner ends of the parallel side beams 13 and 13ª are secured to the end block 16 of fiber, rubber or other insulating material, and the outer ends of the side beams are similarly secured upon opposite sides of the insulating end block 21, to which is also connected the forward end of the lower central rod ar arm 14. Secured at their opposite ends to the end plates 16 and 21 respectively are a pair of conducting rods 22 and 22ª, these rods being preferably arranged below and substantially parallel to the side beams 13 and 13ª respectively, while above the side beams and disposed substantially centrally of the scale beam is provided an upper conducting rod 23, which is also adapted for use in supporting and guiding the poise 25 in its movemnts relatively to the scale, as hereinafter set forth.

Each of the side beams 13 and 13ª shown in Fig. 1 is composed of soft iron or similar magnetic material and is preferably tapered, both as to height and thickness, substantially as shown, so as to distribute the weight of the material irregularly with relation to the length of the beam, the taper and mass of material being arranged and proportioned so that the center of mass of the side beams 13 and 13ª will be in planes adjacent the ends of these side beams. In the illustrated embodiment of the invention the taper of the side beam 13 is directed in the opposite direction from that of the other side beam 13ª whereby the center of mass of the side beam 13 will be in a plane adjacent the opposite end of the beam from the center of mass of the other side beam. Upper and lower webs 26 of brass or similar non-magnetic material are preferably arranged on opposite sides of each of the side beams 13 and 13ª, these webs being oppositely tapered and disposed with relation to the magnetic portion of the side beams so that the upper and lower edges of the side beams will be substantially parallel. (See Fig. 1.)

Suitably secured to the lower central rod 14 of the scale beam and depending therefrom substantially as shown in Figs. 1 and 5 is a bracket 27 adapted to support the switch and selector mechanisms carried by the scale beam and arranged to control the direction and speed of travel of the poise 25 along the scale beam.

The block 28 of fiber or other insulating material is suitably secured upon the bracket 27 and carries upper and lower supporting plates 29 and 30 respectively adapted to receive adjustable stop members 31 and 32 arranged to respectively limit the swinging or tilting movement of the upper and lower pivoted switch or selector bars 33 and 34, as hereinafter set forth. The upper switch or selector bar 33 is pivoted intermediate its ends upon forwardly extending arms of the upper conducting plate 35 (see Fig. 5), which conducting plate 35 is suitably secured upon the insulating block 28 and is electrically connected, as by the wire $b$, with the lower selector bar 22 to conduct the current to the poise 25 through said conductor bar for the purpose hereinafter set forth. The lower switch or selector bar 34 is similarly pivoted between extending arms of the lower conducting plate 36, which is likewise secured to the insulating block 28 and electrically connected, as by means of the wire $a$, with the selector rod 22ª. Each of the pivoted switch bars 33 and 34 is provided with contact members on their opposite arms suitably arranged to respectively engage the intermediate conducting plates 37 and 38 and the upper and lower contacts carried upon the pivoted contact member 41 secured upon the bracket 42 carried by, but insulated from, the crossbar 8 of the scale. (See Fig. 5.) The uppermost plate 37 of the intermediate conducting plates is secured upon the insulating block 28, and is electrically connected, as by means of the wire $d$, with the side beam 13 and the lowermost plate 38 of the intermediate conducting plates is similarly connected, as by means of the wire $c$, with the opposite side beam 13ª of the scale beam. The upper switch or selector member 33 is preferably over-weighted on its outer arm to normally throw the inner arm thereof upwardly into contact with the limiting screw 31, while the lower switch member 34 preferably carries a depending weight 39 upon its inner arm to normally hold the inner arm away from the lower conducting plate 38 and in contact with the limiting screw 32, substantially as shown in Fig. 1. The pivoted contact member 41 may also be provided with a pendulum weight 41ª to aid in normally positioning this contact member and to insure a firm and steady contact of the member with the switch bars 33 and 34 when the scale beam is displaced.

The poise 25 adapted to be automatically moved relatively to the scale beam comprises a pair of solenoid coils 40 and 40ª connected to each other for simultaneous movement by end pieces 43 of insulating material and arranged to surround the side beams 13 and 13ª respectively, the poise preferably being suspended from anti-friction rollers 71 and 71ª resting upon the surface of the upper conducting rod 23 and mounted in the brackets 72 and 72ª carried by the end plates 43. The bracket 72 supporting the roller 71 is preferably connected, as by means of the wire 44, with one end of the wire forming the solenoid coil 40 of the poise, while the bracket supporting the roller 71ª is electrically connected, as by means of the wire 45, with one end of the wire forming the opposite solenoid coil 40ª. The other end of the wire forming the solenoid 40 is connected to the conducting plate 46 of non-magnetic material arranged at one end of the solenoid coil, which is electrically connected, as by means of the fastening screws, with the conducting brush 47 engaging the lower surface of the side beam 13. Also electrically connected, as by means of fastening screws or the like, with the conducting plate 46 is a spring contact arm 48 having its lower end secured upon the end piece 43 of the poise and then extending upwardly, being bent substantially at right angles above the poise and extending into position to normally engage the adjustable contact screw 49 arranged in the laterally extending arm 50 of the bracket 51, which bracket is secured upon the inner surface of one of the end pieces 43 of the poise, substantially as shown in Figs. 2 and 3. The opposite end of the other solenoid coil 40ª is similarly connected to a non-magnetic conducting plate 46ª arranged at the opposite end of the poise from the conducting plate 46, and electrically connected, as by fastening screws or the like, with the conducting brush 47ª adapted to engage the lower surface of the side beam 13ª. The spring contact arm 48ª is electrically connected, as by its fastening screws, with the conducting plate 46ª and is similarly shaped and arranged in position to normally engage the contact screw 49ª carried upon the bracket 51ª substantially as shown. The brackets 51 and 51ª are respectively connected, as by means of the wires 52 and 52ª, with depending brackets 53 and 53ª secured upon the opposite end plates 43 of the poise and provided with laterally extending arms projecting into positions relatively beneath the lower conducting rods 22 and 22ª, contact brushes 54 and 54ª carried by these arms being appropriately arranged to respectively engage the surfaces of these lower conducting bars.

The floating armatures 55 and 55ª are respectively secured adjacent one end to the horizontal arm of the spring conducting members 48 and 48ª (see Fig. 4), and are provided with suitable contacts 56 and 56ª adjacent their free ends arranged to be drawn into engagement with the contact pieces 57 and 57ª carried by brackets secured upon the insulating end pieces 43 of the scale. A pointer 58 is appropriately secured upon the poise 25 to coöperate with the graduations 59, which may be inscribed upon the surface of the side beam 13ª as shown in Fig. 1, or secured in any desired manner upon the scale beam.

The principle upon which the operation of the scale herein shown depends is that whenever an electric solenoid coil is energized it will attract a movable core (or be attracted by a fixed core if the solenoid is movable) and the core and solenoid will be moved relatively to each other until the center of mass of the core and solenoid coincide.

By making the side beams 13 and 13ª of magnetic material irregularly disposed so as to bring their centers of mass adjacent the ends thereof I substantially form a separate core for each of the solenoids 40 and 40ª, and these solenoids being connected together to act as a single poise will move along the scale beam in a forward or reverse direction when one or the other of the solenoids is energized.

In the operation of the scale, the solenoid 40 when suitably energized will, according to the principle above referred to, be drawn toward the center of mass of the soft iron beam 13, which here operates as the core of the solenoid 40, and the solenoid 40ª when energized will be similarly drawn toward the center of mass of the side beam 13ª, which as above stated, is adjacent the opposite end of the beam from the center of mass of the side beam 13. It will be apparent, therefore, that to secure a movement of the poise in one direction the solenoid 40 must be energized, while to secure a movement of the poise in the opposite direction the other solenoid 40ª must be energized. Thus, to secure an advance movement of the poise—i. e., away from the fulcrum of the beam—the solenoid 40ª surrounding the side beam 13ª whose center of mass is farthest removed from the fulcrum will be energized, and when a reverse movement, or movement toward the fulcrum of the beam, is desired, the solenoid 40 surrounding the other side beam 13 will be energized, the center of mass of this side beam being adjacent the fulcrum point.

Assuming now that the scale is in its normal position and the index or pointer 58 of the poise registers with the zero graduation 59, when an article is placed upon the scale platform the scale beam 10 will be rocked upwardly and connections made whereby a circuit is formed to energize the solenoid 40ª so as to move the poise away from the fulcrum point of the beam toward the position on the scale beam counter-balancing the weight of the load on the scale platform. Further, means are provided whereby the poise may be continuously energized to move it rapidly to a position approximating the counter-balancing position on the scale beam and then intermittently energized to slowly advance the poise to exact registry with the counter-balancing position, the change from the continuous to the intermittent energization being automatically controlled by the movement of the scale beam.

The circuit whereby the solenoid 40ª of the poise is continuously energized to accomplish its rapid advance movement as above described is as follows: from the plug P, which is appropriately connected with a source of current, by means of the wire 60 to the insulated screw 61 connected with the bracket 42 which carries the pivoted contact member 41, and through this contact member 41 to the lower pivoted switch or selector bar 34, which bar has been moved upwardly into substantially the position shown in Fig. 5 by the rocking of the scale beam upon the imposition of a load upon the scale platform. From the switch bar 34 the current passes to the lowermost plate 38 of the intermediate conducting plates, thence through the wire $c$ to the side beam $13^a$, thence through the brush $47^a$ to the conducting plate $46^a$ to which one end of the wire forming the solenoid coil $40^a$ is connected, thence through the solenoid coil, the wire 45, bracket $72^a$, anti-friction roller $71^a$ to the upper conducting rod 23, the forward end of which is joined, as by the connector 62 (see Fig. 6), with the lower arm or rod 14, from which return is made to the plug P and source of current through the bracket 18, the insulated screw 63 and wire 65.

As long as the pull exerted by the load upon the scale platform is sufficient to rock the scale beam into the position wherein the pivoted switch bar 34 is brought into contact with the conducting plate 38 as shown in Fig. 5, this continuous energization of the solenoid coil $40^a$ will be effected, and the poise will be rapidly advanced to a position approaching the counter-balancing position on the scale beam. As the poise approaches the counter-balancing position the scale beam falls slightly allowing the pivoted switch bar 34 to again assume a horizontal position, and thereby separates the inner arm thereof from the conducting plate 38 and breaks the circuit for continuously energizing the poise. However, the pivoted contact member 41 is held in contact with the outer arm of the switch member 34 and a circuit is formed for intermittently advancing the poise as follows: from the plug P to the pivoted switch member 41 as in the circuit above described, thence through the switch bar 34, the lower conducting plate 36, upon which the switch bar 34 is pivoted, and the wire $a$ to the lower selector rod $22^a$, which is electrically connected with the solenoid coil $40^a$ through the following mechanisms: the contact brush $54^a$, depending bracket $53^a$, wire $52^a$, and bracket $51^a$ carrying the contact screw $49^a$, the spring contact arm $48^a$ and the conducting plate $46^a$ to which one end of the wire forming the solenoid coil $40^a$ is connected, the circuit then continuing through the solenoid coil, bracket $72^a$ and roller $71^a$ to the upper conducting rod 23 and thence to the source of current through the same connections as are employed in the circuit first described for continuously energizing the coil $40^a$. Upon the energization of the coil $40^a$ due to the completion of the circuit last described, the floating armature $55^a$ connected with the spring contact arm $48^a$ will be drawn downwardly into engagement with the contact piece $57^a$, and in such downward movement separates the contact arm $48^a$ from the contact screw $49^a$ carried by the bracket $51^a$ and breaking the circuit. Simultaneously with the breaking of the circuit as above described the advance movement of the poise which had begun immediately upon the completion of the circuit is stopped, and is not continued again until the spring contact arm $48^a$ returns into engagement with the contact screw $49^a$, whereupon the circuit is completed to again advance the poise and, of course, again attract the floating armature $55^a$ to break the circuit and stop the poise as before. This alternate completion and breaking of the circuit through the spring contact arm $48^a$ results in a series of minute movements of the poise along the scale beam, which will be continued until the poise is brought into registry with the counter-balancing position on the scale beam, at which point the beam is balanced in a position substantially as shown in Fig. 1 with neither of the switch contact bars 33 or 34 in engagement with the pivoted contact member 41.

Should the momentum of the poise carry it slightly beyond the counter-balancing position the beam would fall until the upper switch member 33 lightly engages the pivoted contact member 41 and a circuit is completed for slowly returning the poise to the counter-balancing position, this circuit being designed to intermittently energize the opposite solenoid coil 40. This circuit is as follows: from the plug P and source of current to the pivoted switch member 41 as in the circuit first described, thence through the switch bar 33 and the wire $b$ to the lower selector rod 22, which is electrically connected with the solenoid coil 40 through the contact brush 54, depending bracket 53, wire 52, bracket 50, contact screw 49, and the spring contact arm 48 to the conducting plate 46, the current thence passing through the solenoid coil 40, bracket 72 and roller 71 to the upper conducting rod 23, from which return is made to the plug P and source of current as in the circuit first described. The completion of this circuit through the engagement of the switch bar 33 with the contact member 41 energizes the coil 40 of the poise and tends to move the same toward the center of mass of the side beam 13, which, as before set forth, is adjacent the fulcrum of the scale beam, and simultaneously with this return movement the floating armature 55 connected with the spring contact arm 48 will be drawn downwardly into engagement with the contact piece 57, breaking the circuit. Upon the breaking of the circuit the spring contact arm 48 will return into engagement with the contact screw 49 and the circuit will be again completed to return the poise toward the counter-balancing point, this intermittent completion and breaking of the circuit continuing until the poise is in registry with the counter-balancing position on the scale beam wherein the switch bar 33 is separated from the pivoted contact member 41.

When the load is removed from the scale platform the beam will fall heavily bringing the upper switch bar 33 into engagement with the contact member 41, and rocking said switch bar into a position wherein the contact member carried by its inner arm is moved into engagement with the uppermost plate 37 of the intermediate conducting plates, whereupon a circuit is completed whereby the solenoid coil 40 is continuously energized to return the poise to its normal position wherein the beam is balanced with the pointer 58 in registry with the zero graduation. This circuit is as follows: from the plug P and source of current to the pivoted contact member 41 as in the circuit first described, thence through the switch bar 33, the conducting plate 37 and wire $d$ to the side beam 13, which is electrically connected with the coil 40 through the contact brush 47 and the conducting plate 46, with which one end of the wire forming the solenoid coil is connected, the current continuing through the coil 40, the bracket 72 to which the opposite end of the wire forming the coil is connected and the roller 71 to the upper conducting rod 23, from which return is made to the plug P and source of current as in the circuit first described. As the poise approaches its normal position (wherein the beam is balanced with the switch bars 33 and 34 out of contact with the pivoted member 41) the beam rises, allowing the pivoted switch member 33 to gradually assume a horizontal position, the inner arm thereof receding from the conducting plate 37 breaking the circuit last described, and the circuit is completed through the switch 33, plate 35 and wire $b$ whereby the poise is intermittently energized to allow it to slowly approach its normal position.

Bumpers 64 of rubber or like material may be provided adjacent the opposite ends of the side beams 13 and 13ª to prevent damage to the mechanism.

If it is desired to use batteries, dry cells or the like, provision may be made for inclosing such within the base 6 of the scale, and such batteries, etc., are designated by the reference character Z in Fig. 1. When, however, the batteries Z are to be employed, a jumper should be utilized to close the circuit through the prongs of the plug P.

From the above it will be apparent that I have provided a scale wherein the poise is automatically advanced at different rates of speed to bring it into the exact counterbalancing position wherein the weight imposed upon the scale platform will be accurately offset, and permitting the poise to return at different rates of speed from this counter-balancing position to its normal position on the scale beam upon the removal of the load from the scale platform.

It is to be understood, however, that the illustrated embodiment of my invention is shown merely by way of exemplification and that many changes, variations and modifications may be resorted to without departing from the spirit and scope of my invention, which is defined in the claims hereinafter set forth in such terms as to distinguish it from the prior art so far as known to me, though it is not my intention to relinquish or abandon any portion of the invention.

Having described my invention, I claim:

1. In a scale, a scale beam formed of magnetic material of varying cross-sectional area, a poise having a solenoid coil surrounding the beam, and means for energizing said poise to move same relatively to the beam at different speeds.

2. In a scale, a scale beam formed of magnetic material of varying cross-sectional area, a poise having a solenoid coil surrounding the beam, and current-forming means and connections for energizing said poise to move same relatively to the beam at different speeds.

3. In a scale, a scale beam formed of magnetic material of varying cross-sectional area, a poise having a solenoid coil surrounding the beam, and current-forming means and connections for continuously or intermittently energizing said poise to move same relatively to the beam at different speeds.

4. In a scale, a scale beam formed of magnetic material of varying cross-sectional area, a poise having a solenoid coil surrounding the beam, and current-forming means and connections for continuously or intermittently energizing said poise to move same relatively to the beam at different speeds, said connections including a switch under the control of the movement of the scale beam.

5. In a scale, a scale beam having a pair of side beams formed of magnetic material of varying cross-sectional area, a poise having solenoid coils respectively surrounding said side beams, and current-forming means and connections controlled by the position of the scale beam for continuously or intermittently energizing one or the other of said coils to move the poise in opposite directions at different speeds.

6. In a scale, a scale beam having a pair of side beams formed of magnetic material of varying cross-sectional area, a poise having solenoid coils respectively surrounding said side beams, and current-forming means and connections for continuously or intermittently energizing one or the other of said coils to move the poise in opposite directions at different speeds, said connections including a switch under the control of the movement of the scale beam.

7. In a scale, a scale beam having a pair of side beams formed of magnetic material of varying cross-sectional area, a poise having solenoids coils respectively surrounding said side beams, and current-forming means and connections for continuously or intermittently energizing one or the other of said coils to move the poise in opposite directions at different speeds, said connections including a pair of switches mounted on the scale beam.

8. In a scale, a scale beam having a pair of side beams formed of magnetic material of varying cross-sectional area, a poise having solenoid coils respectively surrounding said side beams, electric means and connections for continuously energizing one or the other of said coils to move the poise in opposite directions at one rate, and electric means and connections for intermittently energizing one or the other of said coils to move the poise at a different rate, including a switch carried by the poise.

9. In a scale, a scale beam having a pair of side beams formed of magnetic material of varying cross-sectional area, a poise having solenoid coils respectively surrounding said side beams, electric means and connections for continuously energizing one or the other of said coils to move the poise in opposite directions at one rate, and electric means and connections for intermittently energizing one or the other of said coils to move the poise at a different rate, including a pair of switches respectively carried by the poise.

10. In a scale, a fulcrumed scale beam formed of magnetic material having its center of mass adjacent the beam fulcrum, a poise having a solenoid coil surrounding the scale beam, means for continuously energizing the coil to move same toward the beam fulcrum at one rate, and means including a switch carried by the poise for intermittently energizing said coil to move same at a different rate.

11. In an electric scale, a scale beam comprising sections insulated from each other, a poise movable relatively to the scale beam, electrical means for moving the poise at a relatively high rate of speed including a section of the scale beam as a conducting medium, and electrical means for moving the poise at a relatively low rate of speed including another beam section as a conducting medium.

12. In an electric automatic scale, a scale beam, a poise including an electric mechanism and automatically movable relatively to the scale beam, current-forming means and connections for continuously energizing the poise to move it at one rate, and means under control of the scale beam for varying the path of the current to intermittently energize the poise to move it at a different rate.

13. In an electric automatic scale, a scale beam, a poise including an electromagnetic mechanism and automatically movable relatively to the scale beam, current-forming means and connections for continuously energizing the poise to move it at one rate, and means under control of the scale beam for varying the path of the current to intermittently energize the poise to move it at a different rate.

14. In an electric automatic scale, a scale beam, a poise including a solenoid coil and automatically movable relatively to the scale beam, current-forming means and connections for continuously energizing the poise to move it at one rate, and means under control of the scale beam for varying the path of the current to intermittently energize the poise to move it at a different rate.

15. In an electric automatic scale, a scale beam, a poise formed of an electric mechanism and automatically movable relatively to the scale beam, means under the control of the movement of the beam for continuously energizing the poise to move it at one rate, and means under the control of the movement of the beam for intermittently energizing the poise to move it at a different rate.

16. In an electric automatic scale, a scale beam, a poise formed of an electro-magnetic mechanism and automatically movable relatively to the scale beam, means under the control of the movement of the beam for continuously energizing the poise to move it at one rate, and means under the control of the movement of the beam for intermittently energizing the poise to move it at a different rate.

17. In an electric automatic scale, a scale beam, a poise formed of a solenoid coil and automatically movable relatively to the scale beam, means under the control of the movement of the beam for continuously energizing the poise to move it at one rate, and means under the control of the movement of the beam for intermittently energizing the poise to move it at a different rate.

18. In an electric automatic scale, a scale beam, a poise formed of an electric mechanism and movable relatively to the scale beam, and means for moving the poise at different rates including means under control of the movement of the scale beam for continuously or intermittently energizing the poise.

19. In an electric automatic scale, a scale beam, a poise formed of an electro-magnetic mechanism and movable relatively to the scale beam, and means for moving the poise at different rates including means under the control of the movement of the scale beam for continuously or intermittently energizing the poise.

20. In an electric automatic scale, a scale beam including a side beam and a selector bar insulated from each other, a poise movable relatively to the scale beam, electrical means for moving the poise at a high rate including the side beam as a conducting medium, and means for moving the poise at a relatively low rate including the selector bar as a conducting medium.

21. In an electric scale, a scale beam comprising a pair of side beams and a pair of selector bars insulated from each other, a poise movable in opposite directions relatively to the scale beam, electrical means for moving the poise at relatively high rates including one or the other of the side beams as conducting mediums, and electrical means for moving the poise at relatively low rates including one or the other of the selector bars as conducting mediums.

SAMUEL G. CRANE.

Witnesses:
H. S. BERGEN,
C. WM. FESSENDEN.

Copies of this patent may be obtained for five cents each, by addressing the "Commissioner of Patents, Washington, D. C."